United States Patent [19]
Anderson

[11] 3,763,596
[45] Oct. 9, 1973

[54] DOOR WINDOW GLASS STABILIZER
[75] Inventor: Thomas W. Anderson, Troy, Mich.
[73] Assignee: Amtel, Inc., Providence, R.I.
[22] Filed: Oct. 27, 1971
[21] Appl. No.: 193,044

[52] U.S. Cl. ............... 49/496, 49/489, 49/492, 49/493
[51] Int. Cl. ............................................. E06b 7/16
[58] Field of Search ............... 49/496, 436, 492, 49/493, 489, 501

[56] References Cited
UNITED STATES PATENTS
2,554,399  5/1951  Bremer ..................... 49/501 X
3,359,688  12/1967  Konolf ..................... 49/496 X
1,998,791  4/1935  Schanz ..................... 49/492 X
2,108,450  2/1938  Schlegel ..................... 49/489
2,223,459  12/1940  Reid ..................... 49/493 X Primary Examiner—Mervin Stein
Assistant Examiner—Philip C. Kannan
Attorney—Charles R. Rutherford

[57] ABSTRACT

A door window glass stabilizer comprising a metal stamping and a strip of elastomeric material. The strip is secured to the stamping by an integral rib on its inner surface which projects through a slot in the stamping. The strip has a yieldable fiber flocking on its outer surface for contact with the window glass.

1 Claim, 3 Drawing Figures

Patented Oct. 9, 1973
3,763,596
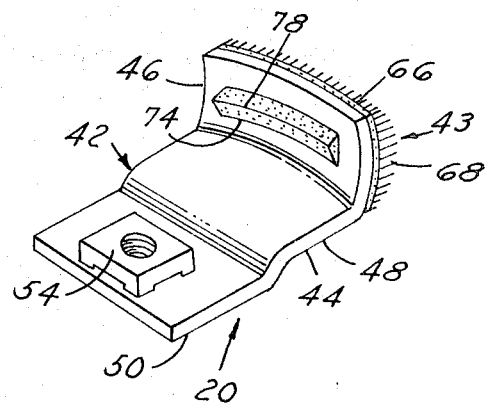
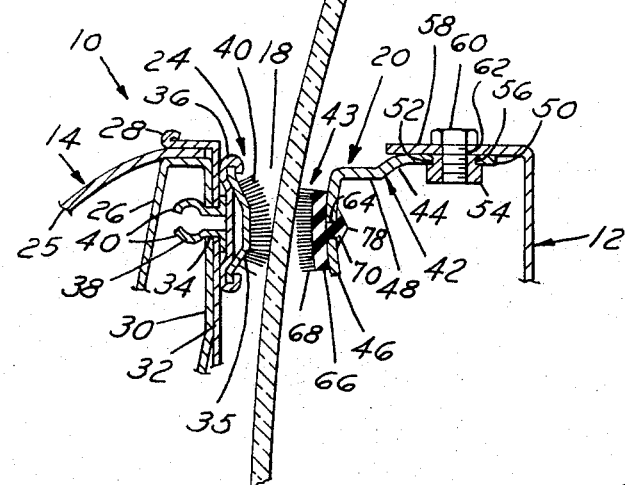
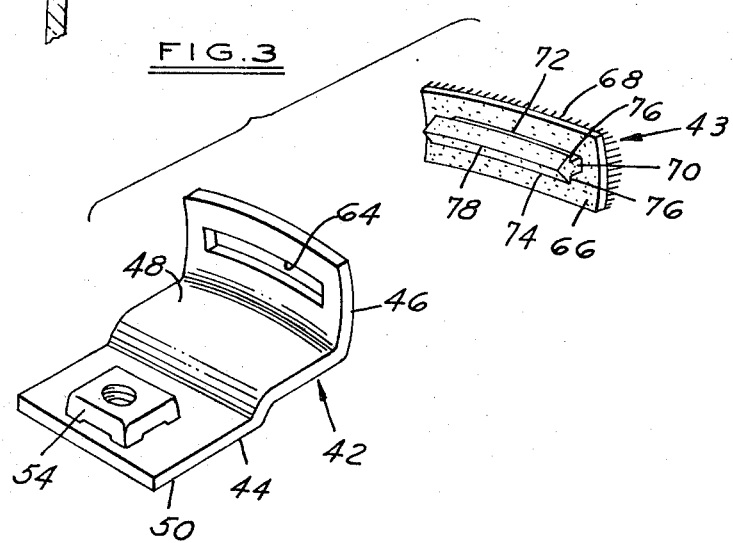

DOOR WINDOW GLASS STABILIZER

SUMMARY OF THE INVENTION

One object of this invention is to provide an improved door window glass stabilizer which is composed of a few simple parts, is easy to assemble, and is highly effective in the performance of its intended function.

Another object is to provide a door window glass stabilizer comprising a support bar and a body of material having a yieldable outer surface adapted to contact and stabilize a window glass, wherein the means for securing the body to the bar comprises an integral projection on the inner surface of the body extending into an aperture in the bar.

Another object is to provide a door window glass stabilizer in which the bar is a metal stamping and the body is a strip of elastomeric material having a fiber flocking on its outer surface for contact with the window glass.

Another object is to provide a stabilizer wherein the metal stamping has a main body portion and a flange portion, the aperture is formed as an elongated slot in the flange portion, and the projection is an elongated rib on the inner surface of the elastomeric strip.

Another object is to provide a glass stabilizer wherein the rib has a locking part spaced from the strip of elastomeric material a distance approximating the thickness of the flange and being wider than the slot so as to lock behind the flange and secure the rib in assembled relation, wherein the locking part has a tapered pilot portion to facilitate entry into the slot, and wherein means are provided on the body portion of the metal stamping by which the stamping may be mounted on a door.

Other objects and features of the invention will become apparent as the description proceeds, especially when taken in conjunction with the accompanying drawing, wherein:

FIG. 1 is a fragmentary vertical sectional view showing portions of the door of an automotive vehicle and including a preferred embodiment of the window glass stabilizer of my invention.

FIG. 2 is a perspective view of the window glass stabilizer.

FIG. 3 is an exploded view in perspective of the parts of the window glass stabilizer.

Referring now more particularly to the drawing, the automotive vehicle door 10 is fragmentarily shown in FIG. 1 and includes the inner and outer door panels 12 and 14 defining a window glass slot 18, the door window glass 16 which is movable vertically in the slot 18 by any suitable operating mechanism not shown, and the door window glass stabilizers 20 and 24 mounted respectively on the inner and outer door panels 12 and 14 to serve as anti-rattle devices by contacting and stabilizing the door window glass.

The outer door panel 14 may be of any suitable construction and in the present instance comprises an exterior wall or metal stamping 25 having a reinforcing frame member 26 and a molding 28 permanently secured thereto by any suitable means. The frame member 26 and molding 28 have the contacting vertical plate portions 30 and 32 formed with registering openings defining a hole 34 for mounting the door window glass stabilizer 24.

The door window glass stabilizer 24 forms no part of the present invention and may be of any suitable construction. In the present instance, it comprises a plate 35 secured in a channel 36. A snap fastener 38 composed of the flexible legs 40 is secured to channel 36 and is adapted to project through the hole 34 to frictionally mount the stabilizer 24 on the outer door panel 14. The plate 35 has a flexible or yieldable material 40 such as fiber flocking on its inner surface adapted to contact and stabilize the window glass 16.

The stabilizer 20 of my invention comprises a bar or plate 42 and a body 43 of yieldable material. The bar 42 is here shown as being in the form of a metal stamping having a main body portion 44 and a terminal flange 46 at one end of the main body portion forming substantially a right angle therewith. The main body portion has the parallel but slightly vertically offset sections 48 and 50, the offset being provided to strengthen the main body portion and also to position the flange 46, which is the mount for the body 43, somewhat below the top of the window glass slot 18 as will appear in FIG. 1.

The main body portion 44 has a hole 52 in the section 50 thereof, and a nut 54 is permanently secured to the section 50 in a position such that its threaded aperture is aligned with the hole 52. Actually, as clearly seen in FIG. 1, the nut 54 has a hollow stem or extension 56 on one side which extends into the hole 52 and is upset on the side of the hole opposite the nut to serve as a means for permanently retaining the nut 54 in assembly with the metal stamping. The nut threads are continuous throughout the length of the hollow stem. The body portion 44 of the metal stamping may thus be secured to the underside of the flange 58, which is an outwardly turned portion at the upper end of inner door panel 12, by a bolt 60 extending through a hole 62 in flange 58 and threading into the nut 54.

The stabilizer 20 when mounted on the inner door panel as shown in FIG. 1 has its flange 46 turned downwardly. Such flange has an elongated horizontal slot 64 formed in it.

The body 43 of yieldable material includes an elongated strip 66 of resilient, compressible elastomeric material such as rubber, which strip has a yieldable fiber flocking 68 bonded or adhered or otherwise secured upon its outer surface for contact with the surface of the window glass. The elastomeric strip 66 has an integral elongated horizontal rib 70 on its inner surface which is of a length approximating or slightly less than the length of the slot 64. The rib consists of a base or main body portion 72 adjacent the strip 66 which is of a width approximating or slightly less than the width of the slot 64.

On the free or inner end of the main body portion 72, the rib 70 has a locking part 74 which is wider than the main body portion 72 and wider than slot 64 and at its juncture with the main body portion forms retaining bias or shoulders 76. The locking part is tapered in an inward direction towards its free end where the sides meet in a straight line to provide a pilot portion 78 facilitating the assembly of the elastomeric strip 66 with the metal stamping. The thickness of the main body portion 72 of rib 70, that is its extent measured from the elastomeric strip 66 to the shoulders 76 of the locking part 74, is the same as the thickness of the flange 46 of the metal stamping 42.

As seen in FIGS. 1 and 2, the elastomeric strip is secured to the flange 46 so that its inner surface is in full surface-to-surface contact with the outer surface of flange 46. The rib 70 projects through the slot 64 and the shoulders 76 of the locking part 74 bear against the outer surface of flange 46 to resist separation of the elastomeric strip from the metal stamping. The pilot portion 78 of the locking part 74 of the rib 70 allows the rib to be forced through the slot to the position of FIGS. 1 and 2 by thumb pressure, the side edges of the locking part folding back during the assembly.

The parts 42 and 43 of stabilizer 20 are firmly held together and will not become separated during normal use. When the stabilizer is secured to the inner door panel 12 in the manner shown in FIG. 1, the fiber flocking 68 yieldably presses against the window glass to stabilize it and act as an anti-rattle device. Obviously more than one such stabilizer 20 may be used if desired.

What I claim as my invention is:

1. A door window glass stabilizer, comprising a metal support bar having an integral body portion and flange, a body including a resilient, compressible elastomeric strip having a fiber flocking on its outer surface adapted to contact the door window glass, and means for mounting said body on the outer face of the flange of said bar comprising an elongated slot in said flange and an elongated integral rib on the inner surface of said strip of approximately the same length as said slot, said rib having an elongated base portion integrally joined throughout its length to said strip, the width and depth of said base portion being approximately the same as the width and depth of said slot, said rib having an elongated locking portion coextensive with and integrally joined throughout its length to said base portion and being wider than said base portion to provide a pair of retaining lips projecting laterally outwardly from opposite sides of said base portion, said rib projecting through said slot and said retaining lips of said locking portion bearing against the inner face of the flange of said bar to hold said strip in full surface-to-surface contact with the outer face of the flange of said bar, said base portion of said rib substantially filling said slot and said retaining lips being adapted to compress laterally inwardly during entry into said slot, said locking portion having a tapered pilot portion leading to said retaining lips to facilitate entry into said slot, an aperture in the body portion of said bar, a nut provided with a cylindrical extension on one side thereof, said extension being located in said aperture and staked therein to permanently retain said nut on one side of said body portion, said nut and said extension being internally threaded to permit the mounting of said bar on a door.

* * * * *